United States Patent [19]

Goodrich

[11] Patent Number: 5,016,936
[45] Date of Patent: May 21, 1991

[54] COMPOSITE LINER FOR MOTOR VEHICLES

[76] Inventor: David Goodrich, 78 Chestnut St., Andover, Mass. 01810

[21] Appl. No.: 491,439

[22] Filed: Mar. 9, 1990

[51] Int. Cl.⁵ ............................................. B62D 25/00
[52] U.S. Cl. ...................................... 296/39.3; 428/95
[58] Field of Search ..................... 296/39.3, 39.1, 39.2; 428/95, 90

[56] References Cited

U.S. PATENT DOCUMENTS

| | | | |
|---|---|---|---|
| 3,953,632 | 4/1976 | Robinson | 428/95 |
| 4,131,703 | 12/1978 | Voet | 428/95 |
| 4,733,902 | 3/1988 | Rabb | 296/39.3 |

FOREIGN PATENT DOCUMENTS 53145   3/1988   Japan .................................. 296/39.3

*Primary Examiner*—Robert R. Song
*Attorney, Agent, or Firm*—Edward A. Gordon

[57] ABSTRACT

The composite liner structure for the interior of motor vehicles in accordance with the present invention includes a sheet section comprising a backing portion of flexible material and an outer surface portion of plush fibers. The plush fibers provide a generally soft resilient face. A pressure sensitive adhesive layer is disposed upon the backing of the sheet section for attaching the backing portion of the liner structure to the interior surface of a motor vehicle. A releasable non-adhesive material cover is disposed on the adhesive layer. The composite liner structure has a predetermined profiled contoured configuration matching the profiled contoured interior surface of the motor vehicle to be lined. Additionally the composite liner structure is preferably formed of thermally insulative material. In one embodiment, the outer surface portion of plush fibers can be provided with decorative indicia. In still another embodiment, a flexible layer of heat reflective material is disposed between the backing portion of the sheet section and the adhesive layer.

10 Claims, 3 Drawing Sheets

COMPOSITE LINER FOR MOTOR VEHICLES

BACKGROUND OF THE INVENTION

1. Field of the Invention

The present invention relates generally to interior lining for motor vehicles and, more particularly, to a new and improved composite headliner structure for motor vehicles.

2. Description of Prior Art

Numerous motor vehicles when manufactured are provided with structures particularly the top panel or head, side panels and rear panels the interior surfaces of which are not provided with a liner or interior trim material. Many of such vehicles have removable tops while others have removable side and rear panels as well as tops. Such panel structures are generally formed of plastic materials such as thermoplastic, synthetic resin materials such as, for example, plexiglass. Others are formed of light weight metals such as steel. Another type of such vehicle is a jeep or jeep type vehicles which feature an open top frame with side and top bars over which a flexible cloth canopy usually bearing windows is releasably disposed. Such vehicles include one or more of such disadvantages as being noisy, drafty, becoming very hot in the summer and very cold in the winter.

Various interior liners, trim panels and head liners formed of a variety of materials and structures have been provided in an effort to overcome the disadvantages of such motor vehicles.

The state of the art of such interior liners is believed to be exemplified in the following U.S. Patents: U.S. Pat. Nos. 4,733,902, 4,211,590, 4,432,580, 3,300,357

While such prior art devices provide improvement in the areas intended, there still exists a great need for an improved liner structure which is easy to produce, which minimizes noise value while maximizing thermal insulative value and which is distinguished by the ease and speed of attachment.

Accordingly, a principal desirable object of the present invention is to provide a new and improved composite liner structure which overcomes the problems and disadvantages associated with the various liner devices heretofore known.

Another desirable object of the present invention is to provide a new and improved composite liner structure which minimizes noise value while maximizing the thermal insulative value both in heat and cold environments.

A still further desirable object of the present invention is to provide a composite liner structure which provides a decorative and attractive appearance, simple installation and excellent durability.

A still further desirable object of the present invention is to provide a composite liner structure which lends itself to relatively inexpensive mass production.

These and other desirable objects of the invention will in part appear hereinafter and will in part become apparent after consideration of the specification with reference to the accompanying drawings and the claims.

SUMMARY OF THE INVENTION

The composite liner structure for the interior of motor vehicles in accordance with the present invention includes a sheet section comprising a backing portion of flexible material and an outer surface portion of plush fibers. The plush fibers provide a generally soft resilient face. A flexible pressure sensitive adhesive layer is disposed upon the backing of the sheet section for attaching the backing portion of the liner structure to the interior surface of a motor vehicle. A releasable non-adhesive flexible material cover is disposed on the adhesive layer. The composite liner structure has a predetermined profiled contoured configuration matching the profiled contoured interior surface of the motor vehicle to be lined. Additionally the composite liner structure is preferably formed of thermally insulative material. In one embodiment, the outer surface portion of plush fibers can be provided with decorative indicia and designs. In still another embodiment, a flexible layer of heat reflective material is disposed between the backing portion of the sheet section and the adhesive layer.

BRIEF DESCRIPTION OF THE DRAWINGS

For a fuller understanding of the nature and desired objects of the present invention, reference should be made to the following detailed description taken in conjunction with the accompanying drawings wherein like reference characters denote corresponding parts throughout several views and wherein.

DESCRIPTION OF PREFERRED EMBODIMENT(S)

Figure 1:
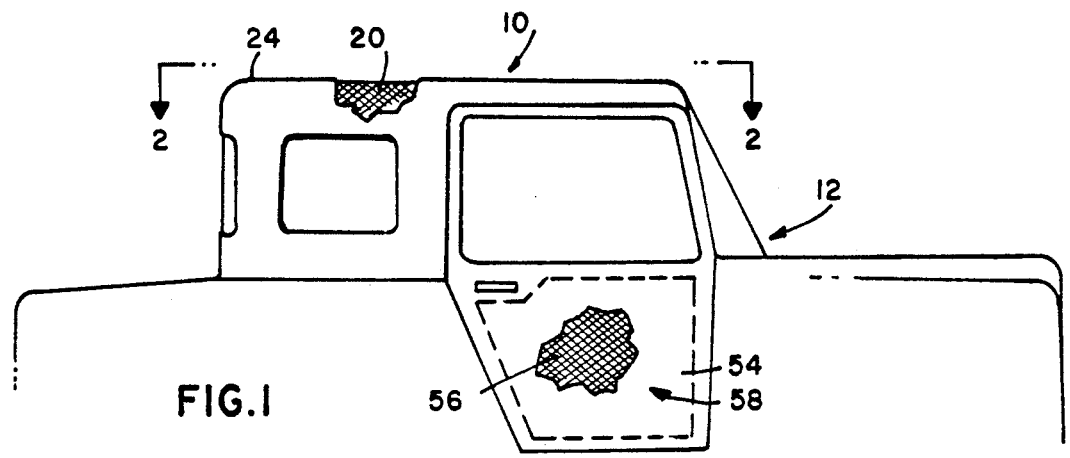
FIG. 1 is a schematic side elevational view, partly broken away, of a portion of a motor vehicle with a composite liner structure of the present invention in place over the interior surface of the canopy.

Referring now to the drawings and more particularly to FIGS. 1-5, there is schematically shown a composite liner embodying the principles of the present invention. The composite liner structure (hereinafter sometimes referred to as "liner") indicated generally by the numeral 10 is shown in detail in FIGS. 3-5 and is shown as installed in a motor vehicle 12 of FIGS. 1 and 2.

Figure 5:
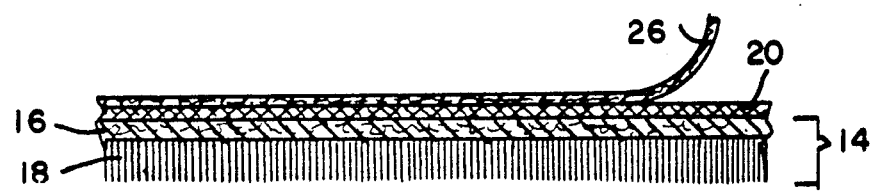
FIG. 5 is an enlarged fragmentary cross sectional view of a composite liner structure illustrating the principles of the present invention.

The composite liner structure 10 includes a sheet of base section 14 (as best seen in FIG. 5) which comprises a backing portion 16 and an outer surface portion 18 of plush fibers. A pressure sensitive adhesive layer 20 is disposed upon the backing portion 16 of the sheet section 14. The adhesive layer 20 serves to attach the backing portion 16 of the sheet section 14 to the interior surface 22 of the motor vehicle canopy 24. A releasable non-adhesive layer 26 is disposed on the adhesive layer 20 to protect the adhesive layer until the liner 10 is attached to the area of the vehicle to be lined.

Figure 2:
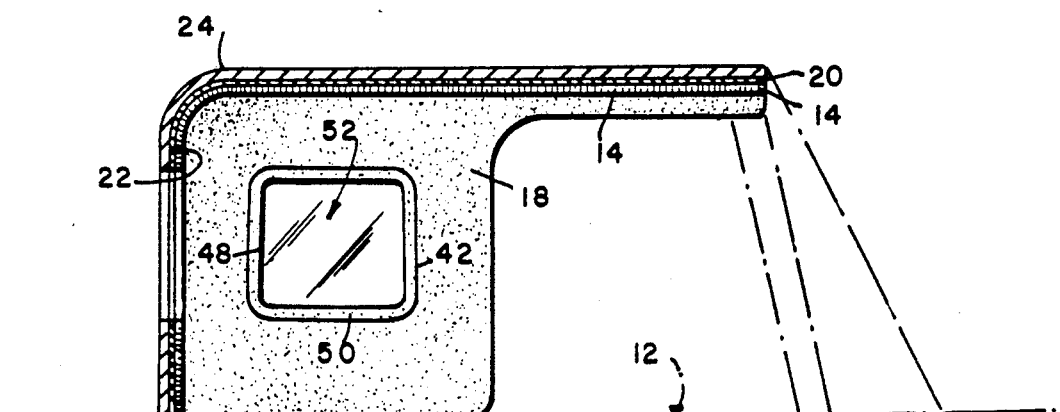
FIG. 2 is a slightly enlarged cross sectional view taken along the line 2—2 of FIG. 1.
Figure 3:
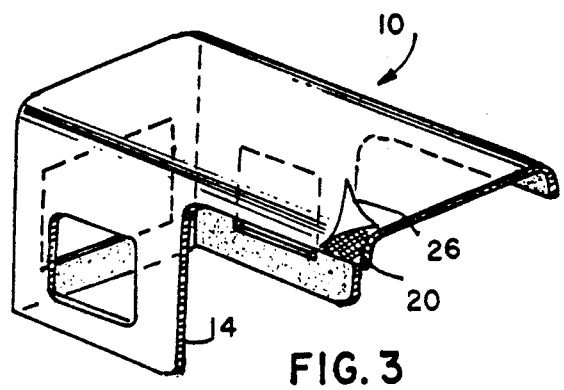
FIG. 3 is a perspective view illustrating the composite liner structure embodying the principles of the present invention in the form of a liner for a motor vehicle canopy of the type shown in FIGS. 1 and 2.
Figure 4:
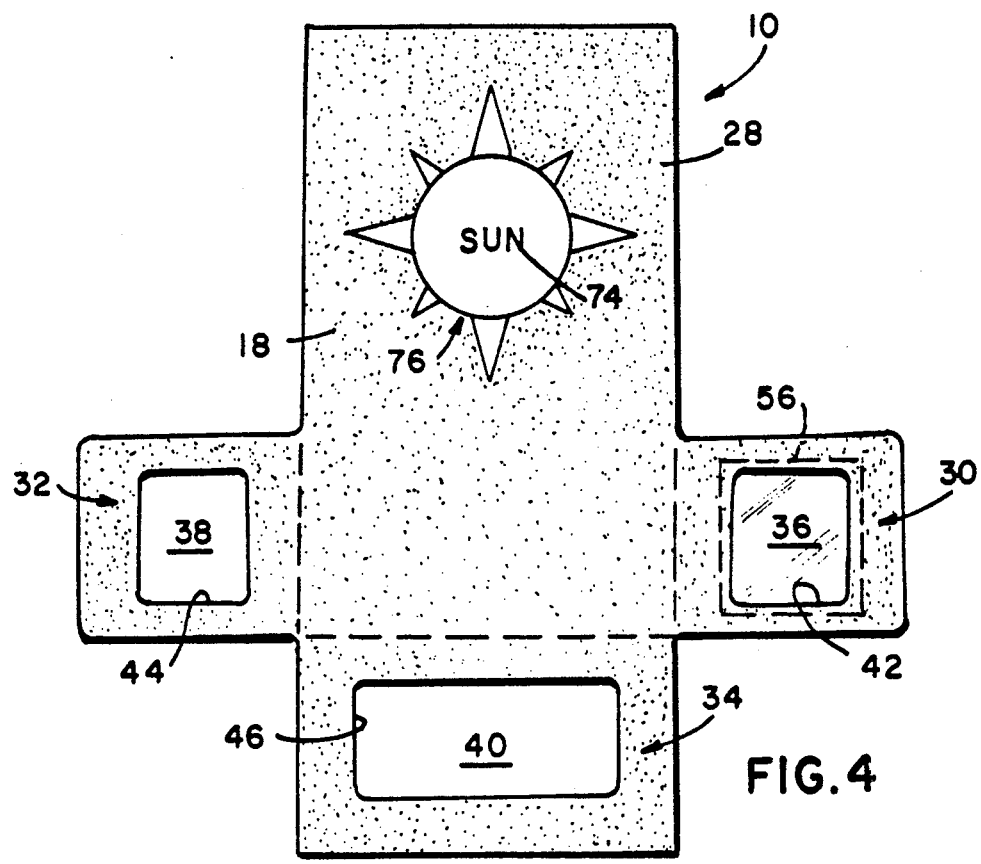
FIG. 4 is a bottom plan view of the composite liner structure of the present invention as illustrated in FIG. 3.

Referring now more particularly to FIG. 4, the composite liner structure 10 is provided with a predetermined profiled contoured configuration matching the profiled contoured interior surface portion of the motor vehicle to be lined. The liner 10 as illustrated includes a top panel portion 28, side panel portions 30 and 32 and rear panel portion 34. The predetermined profiled contour which matches the interior surface to be lined together with the adhesive backing provides for simple fast installation as discussed further hereinafter. As illustrated the liner structure is provided with side openings 36 and 38 and rear opening 40 which are defined respectively by peripheral edges 42, 44 and 46 which (as best seen in FIG. 2) conform to the outer peripheral edge 48 of the frame 50 of the window 52.

It is to be understood that when a motor vehicle such as certain recreational vehicles have window openings but do not have windows the composite structure can be provided with windows. For example, the openings 36, 38 and 40 of the composite structure 10 as shown in FIG. 4 can be covered with a panel layer of a transparent plastic material such as polyethylene, polypropylene or the like. The transparent plastic panel layer as shown by the phantom lines 56 would be attached between the sheet section 14 and the adhesive layer 20 (which attachment is not shown) to cover the opening 36, for example. When desired, thermally insulated windows can be formed of multiple plies of the transparent plastic panel layers (not shown).

Referring again to FIG. 1, there is illustrated in phantom 54 a composite liner structure 59 having the configuration of and attached to the interior surface of the lower portion of the door 58.

Figure 6:
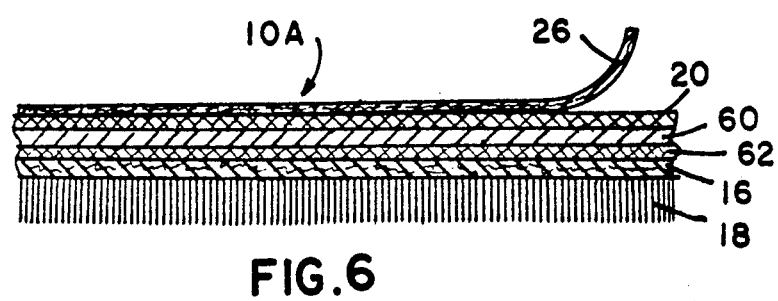
FIG. 6 is an enlarged fragmentary cross sectional view of another embodiment of a composite liner structure illustrating the principles of the present invention.

Referring now to FIG. 6, there is illustrated another embodiment of the composite liner structure of the present invention. The liner 10A is substantially identical to liner 10 except that the liner is provided with a thin heat reflecting metalized layer 60 which is attached to the backing portion 16 by a suitable flexible adhesive binder 62 such as glue. The adhesive layer 20 is disposed on the metalized heat reflective layer 60. A suitable metalized layer is aluminum coated MYLAR.

The sheet section 14 of the composite liner structure 10 can be formed of a plush pile faced layer attached to a backing layer. The backing layer can be formed of a suitable non-woven material such as leather, fur, cloth, felt or plastic. The pile faced portion can be formed of a woven plush material such as polyesters, nylon, polyethylene and the like. Conventional processes (and equipment therefor) such as weaving and knitting can be employed to form the plush pile layer portion. Additionally the invention contemplates the backing layer portion formed of woven or knitted materials as mentioned above.

The thickness of the composite liner as well as the materials forming the liner are preferably selected to reduce sound transmission and provide thermal insulation and fire retardation. Suitable thermally insulated material such as quilted plastic, wool, cotton, or other cloth material can be used.

Figure 7:
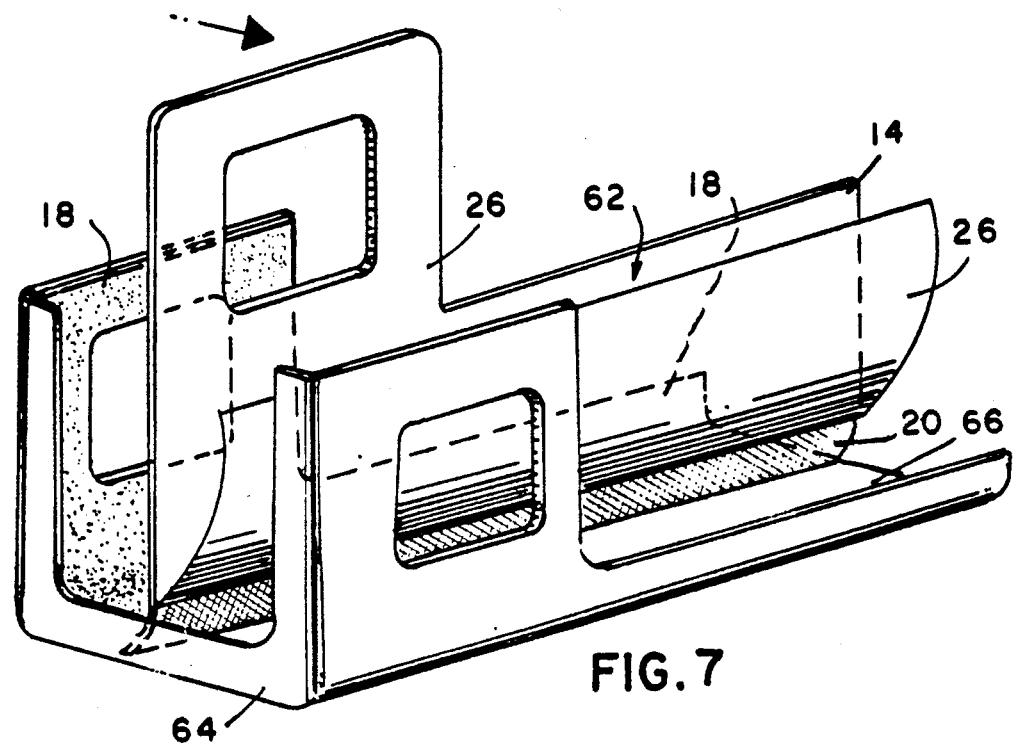
FIG. 7 is a perspective view illustrating a composite liner structure of the present invention in the process of being attached to a canopy of the type illustrated in FIGS 1 and 2.

Referring now to FIG. 7, there is illustrated a composite liner structure 62 in the process of being attached to the interior surface 66 of a removable fiberglass canopy 64 which is shown in the inverted position for clarity of illustration. The composite liner 62 is similar to the liner 10 of FIG. 4 except that it does not have a rear panel portion such as 34 of FIG. 4. As shown the composite liner 62 is formed with a predetermined profiled contoured configuration matching the interior surface of the canopy 64. As the non-adhesive cover layer 26 is removed the adhesive layer 20 is pressed against the interior surface 66 of the canopy 64 whereby the attachment process is complete. The sheet section 14 which includes the outer surface portion of plush fibers becomes the inner surface of the canopy.

Figure 8:
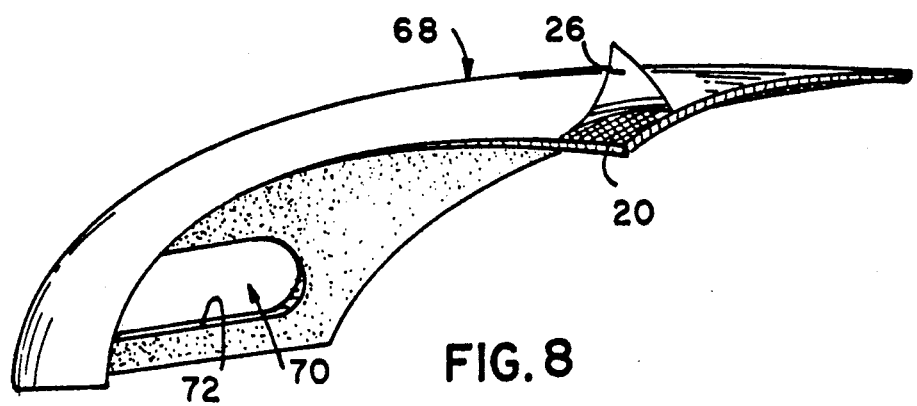
FIG. 8 is a perspective view of an alternate embodiment of a composite liner structure in accordance with the present invention.

Referring now to FIG. 8, there is shown a perspective view of an alternate embodiment of the composite liner structure in accordance with the present invention. The flexible liner 68 with a rear window opening 70 defined by the perimeter edge 72 illustrates that the flexible composite liner structure of the present invention having components similar to that of FIG. 5 can be easily configured to conform to the steel headliner panel (not shown) of a standard automobile over which it can be easily attached by removing the non-adhesive layer 26 and pressing the adhesive layer 20 to the inner steel roof headliner panel whereby the liner 68 is installed.

Referring again to FIG. 4, the present invention contemplates providing the outer surface 18 of plush fibers or nap with decorative indicia and/or designs. A design 76, for example, can depict a radiant sun with indicia 74 indicating it as such. The designs and indicia can, for example, be provided by a method of producing colored patterns on the nap of fabrics, in which the nap or pile fibers are subjected briefly to pressure and heat to modify the absorption capacity of the synthetic fibers 18 after which the pile fabric is dyed in a conventional manner. A method for providing such designs is described in U.S. Pat. No. 4,147,507.

While the invention has been described with respect to preferred embodiments, it will be apparent to those skilled in the art that changes and modifications may be made without departing from the scope of the invention herein involved in its broader aspects. Accordingly, it is intended that all matter contained in the above description, or shown in the accompanying drawing shall be interpreted as illustrative and not in limiting sense.

What is claimed is:

1. A flexible composite liner structure for the interior of a motor vehicle having a profiled contoured surface, said composite liner structure comprising:
   a sheet section comprising a backing portion of flexible material and an outer surface portion of plush fibers;
   a flexible layer of heat reflective material disposed upon the backing portion of said sheet section;
   a pressure sensitive adhesive layer disposed upon the layer of heat reflective material for attaching said composite liner structure to the interior surface of a motor vehicle; and
   a releasable non-adhesive material covering said adhesive layer;
   said composite liner structure having a predetermined profiled contoured configuration matching the profiled contoured interior surface of the motor vehicle to be lined.

2. A flexible composite liner structure for the interior of a motor vehicle having a profiled contoured surface, said composite liner structure comprising:

a sheet section comprising a backing portion of thermally insulative flexible material and an outer surface portion of plush fibers;

said push fibers provided a generally soft resilient face;

a flexible layer of heat reflective material disposed upon the backing portion of said sheet section;

a pressure sensitive adhesive layer disposed upon said layer of heat reflective material for attaching the backing portion of said composite liner structure to the interior surface of a motor vehicle; and a releasable non-adhesive material covering said adhesive layer;

said composite liner structure having a predetermined profiled contoured configuration matching the profiled contoured interior surface section of the motor vehicle to be lined.

3. The flexible composite structure according to claim 2 wherein the composite liner structure is provided with a predetermined profiled contoured configuration having a top section, rear section and side sections matching the top, rear and side sections of the interior of the motor vehicle to be lined.

4. The composite liner structure according to claim 3 wherein the top, rear and side sections are each provided with an opening defined by a peripheral edge conforming to the peripheral edge of a juxtaposed window of the motor vehicle to be lined.

5. The flexible composite liner structure according to claim 2 wherein the backing portion of the sheet section is formed of a polymer material.

6. The flexible composite liner structure according to claim 2 wherein said outer surface portion of plush fibers is provided with decorative indicia on the fibers thereof whereby the indicia faces the interior of the motor vehicle.

7. The flexible composite liner structure according to claim 2 wherein said structure includes window members.

8. The flexible composite liner structure according to claim 2 wherein the interior contoured surface of the motor vehicle is formed of plexiglass.

9. The flexible composite liner structure according to claim 2 wherein the interior contoured surface of the motor vehicle is formed of metal.

10. The flexible composite liner structure according to claim 1 wherein the backing portion of said sheet section comprises a thermally insulative material.

* * * * *